No. 885,873. PATENTED APR. 28, 1908.
G. F. SEEMS & G. B. COPLY.
WIRELESS CHECK ROW PLANTER.
APPLICATION FILED APR. 29, 1907.
2 SHEETS—SHEET 1.
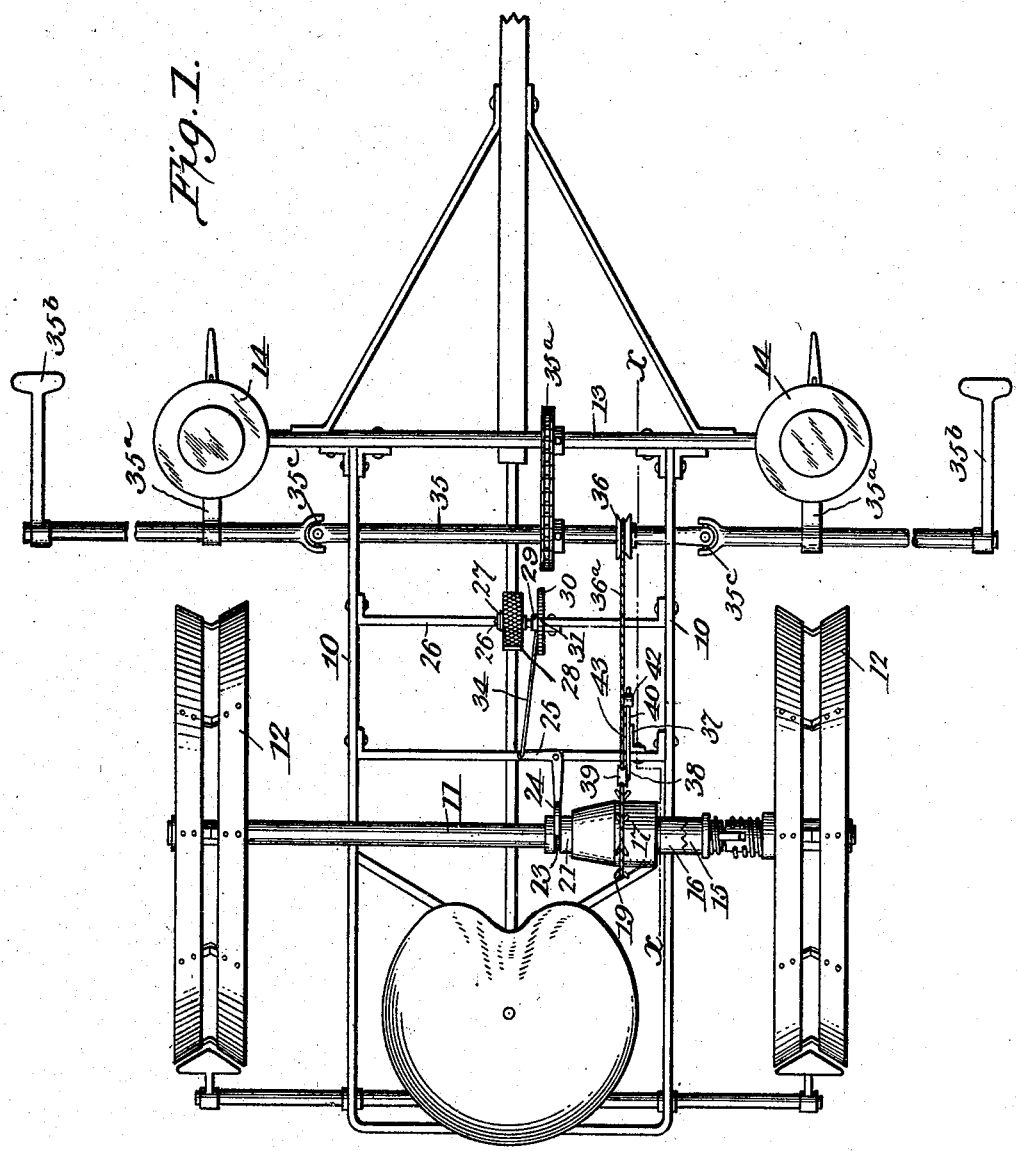
Witnesses:
R. H. Decker
F. C. Dahlberg
Inventor.
G. F. Seems by G. B. Coply
by Orwig & Lane Atty's.

No. 885,873.
PATENTED APR. 28, 1908.
G. F. SEEMS & G. B. COPLY.
WIRELESS CHECK ROW PLANTER.
APPLICATION FILED APR. 29, 1907.
2 SHEETS—SHEET 2.
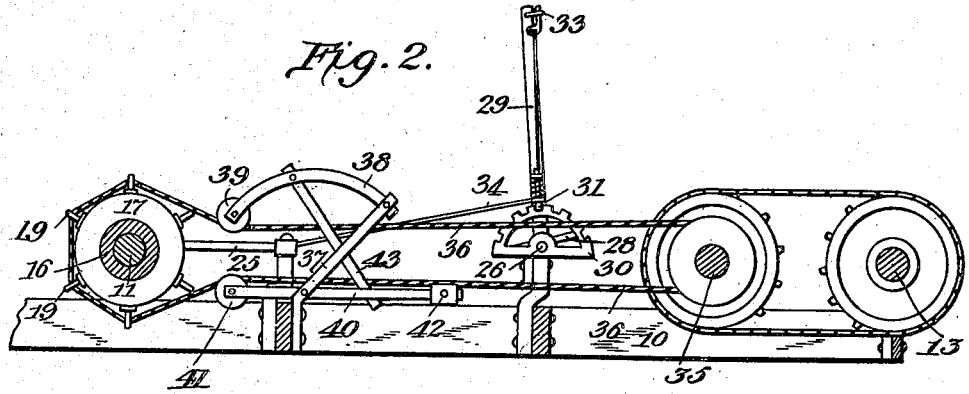
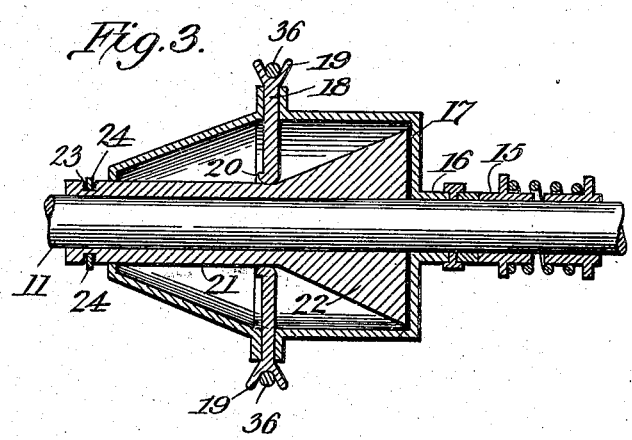
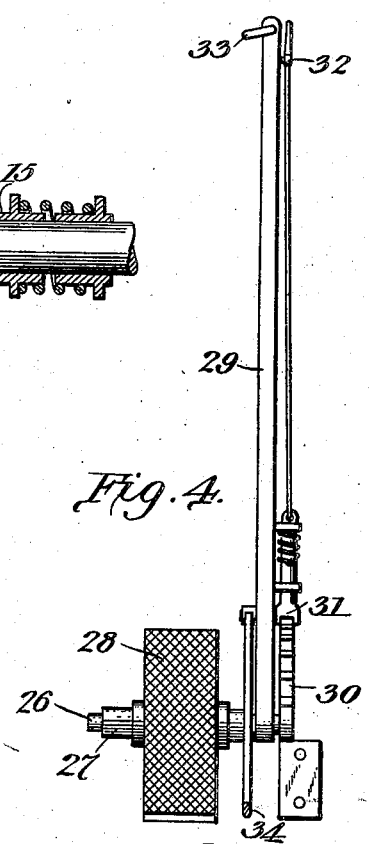
Witnesses:
R. H. Decker.
F. C. Dahlberg.
Inventor,
G. F. Seems & G. B. Coply
by Craig & Lane
Atty's.

UNITED STATES PATENT OFFICE.

GAILLARD F. SEEMS AND GEORGE B. COPLY, OF MITCHELLVILLE, IOWA.

WIRELESS CHECK-ROW PLANTER.

No. 885,873.            Specification of Letters Patent.            Patented April 28, 1908.

Application filed April 29, 1907. Serial No. 370,767.

*To all whom it may concern:*

Be it known that we, GAILLARD F. SEEMS and GEORGE B. COPLY, citizens of the United States, residing at Mitchellville, in the county of Polk and State of Iowa, have invented a certain new and useful Wireless Check-Row Planter, of which the following is a specification.

The object of our invention is to provide a device of the class described in which the operator may readily and easily increase or diminish the spaces between the hills being planted, to thereby correct any inaccuracy in check rowing that may occur on account of the slipping of the traction wheels, or the irregularities in the ground surface over which the planter is passing.

Our invention consists in the construction, arrangement and combination of the various parts of the device, whereby the objects contemplated are attained, as hereinafter more fully set forth, pointed out in our claims, and illustrated in the accompanying drawings, in which—

Figure 1 shows a plan view of a planter provided with our improvement. Fig. 2 shows an enlarged detail sectional view on the line $x\ x$ of Fig. 1. Fig. 3 shows an enlarged detail sectional view of the device carried by the axle of the planter. Fig. 4 shows an enlarged detail view of the operating lever, and the operating treadle. Fig. 5 shows a detail side view illustrating the supports for the marker arms.

Referring to the accompanying drawings, we have used the reference numeral 10 to indicate the planter frame, 11 the axle to which the traction wheels 12 are attached, and 13 the shaft of the seed droppers, the seed boxes being indicated by the numeral 14. In this connection it is to be understood that any of the ordinary forms of seed droppers may be used, as these devices form no part of our present invention.

One of the traction wheels is fixed to the axle 11, and the other loosely mounted thereon, and provided with a spring actuated ratchet clutch member 15, to coact with a fixed clutch member 16 on the axle 11, so that in backing or turning corners, one of the traction wheels 12 may remain stationary, while the other is moved. This device is also in ordinary use. Connected with the fixed ratchet clutch member 16 is a hollow casing 17, having a series of radial openings therein, through which the arms 18 are slidingly extended. The outer rim of each arm 18 is forked at 19, and its inner end is rounded at 20. Slidingly mounted on the axle 11 within said casing 17, is a guide block comprising a cylindrical body portion 21, and an enlarged inclined portion 22, one end of said guiding block projects beyond the casing 17, and is provided with an annular groove 23 into which the inner arm of a bell crank lever 24 is mounted. This bell crank lever is fulcrumed at 25 to a part of the planter frame. We have provided means for actuating this bell crank lever as required to move the guiding block 21 longitudinally within the casing 17 as follows: Mounted on the planter frame in front of the axle is a shaft 26, to which we have fixed a sleeve 27, carrying the foot treadle 28, and a hand lever 29. Mounted adjacent to the shaft 26 is a sector 30, to be engaged by a spring actuated pawl 31, carried by the lever 29. The handle 32 for actuating the pawl 31 may be held by a pivoted keeper 33, to position with the pawl 31, elevated out of engagement with the sector 30, or if said keeper is placed in the position shown in Fig. 4, then the spring actuated pawl will be normally held in engagement with the sector. A rod 34 is provided to connect the lever 29 with the bell crank lever 24.

By means of the mechanism just described, the operator may by manipulating the lever 29, either by hand power, or by foot power, cause the guide block on the axle to be moved to any position of its adjustment within the casing 17, and obviously, when said guiding block is in the position shown in Fig. 3, the arms 18 will be at their inner limit of movement, and when said block is moved inwardly toward the center of the axle 11, then the arms 18 will be extended to their outer limit.

Located adjacent to and in the rear of the operating shaft 13, is a marker arm shaft 35 connected by a sprocket gearing 35ª with the shaft 13. This shaft 35 has its bearings in the frame, and on its ends are the marker arms 35ᵇ. Universal joints are formed in the marker shaft at 35ᶜ, so that the outer ends of the marker arms may rise and lower to conform with the ground surface, said outer ends being supported in the slotted bearings 35ª. Mounted upon the shaft 35, is a pulley 36 connected by a belt 36ª with the arms 18, said belt running between the forked ends of said arms as shown in Figs. 2 and 3. We have provided means for automatically taking up any slack in the belt 36ª that may be occasioned by decreasing the diameter of the pulley device on the axle 11, over which said belt passes, as follows: Fixed to a part of the frame 10 is a supporting bar 37, having pivoted to its upper end a curved arm 38, carrying the pulley 39. Pivoted near the lower end of the arm 37 is a lever 40, having mounted on its forward end a pulley 41, and also having mounted on its rear end an adjustable weight 42. A link 43 is provided for connecting the forward portion of the curved arm 38 with the rear portion of the lever 40. In this manner, the weight 42 serves to apply a yielding pressure downwardly upon the pulley 39, and upwardly upon the pulley 41. Thus any slack in the belt 36 will be taken up, and furthermore, this weight and pulley device will apply a yielding pressure to the arms 18, tending to hold them into engagement with the guide block on the axle.

In practical use, and assuming that the planter is being advanced across a field, the operator adjusts the lever 29 to such position that under ordinary circumstances and conditions of the field, the seeds dropped by the planter will be accurately arranged in check rows. If for any reason the operator should find that the seeds being planted were not accurately arranged in check with the seeds previously planted, he may then grasp the lever 29 and move it either forwardly or rearwardly, as required to increase or diminish the diameter of the rear pulley device for the belt 36ª, and he may then secure the lever 29 in its desired position by means of the pawl and sector. If desired the operator may place the keeper 33 upon the handle 32 of the pawl, thus releasing the pawl from its sector, and the operator may then by placing his foot upon the treadle 28, control the guide block upon the axle, as may be desired. It is to be understood that any of the usual marking devices for the hills being planted, is to be employed in connection with our device, so that the operator may determine whether or not the hills are being accurately planted in check rows.

Having thus described our invention, what we claim and desire to secure by Letters Patent of the United States therefor, is—

1. In a device of the class described, the combination of a rotatable axle, a rotatable operating shaft, a casing fixed to the axle, a series of arms radially movable in said casing, their outer ends being adapted to receive a belt, a pulley operatively connected with the operating shaft, a belt connecting said pulley with said arms, a cylindrically tapered guide block slidingly mounted on the axle within the casing, and means for sliding said block to give a radial movement outwardly to the said arms.

2. In a device of the class described, the combination of a rotatable axle, a rotatable operating shaft, a casing fixed to the axle, a series of arms radially movable in said casing, their outer ends being adapted to receive a belt, a pulley operatively connected with the operating shaft, a belt connecting said pulley with said arms, a cylindrically tapered guide block slidingly mounted on the axle within the casing, means for sliding said block to give a radial movement outwardly to the said arms, said means comprising a combined hand lever and foot treadle, an adjusting device connecting the hand lever with the guide block, a spring actuated pawl carried by the lever, a sector to coact with the pawl, and a keeper for holding the spring actuated pawl out of engagement with the sector.

3. In a device of the class described, the combination of a rotatable axle, a rotatable operating shaft, a casing fixed to the axle, a series of arms radially movable in said casing, their outer ends being adapted to receive a belt, a pulley operatively connected with the operating shaft, a belt connecting said pulley with said arms, a cylindrically tapered guide block slidingly mounted on the axle within the casing, and means for sliding said block to give a radial movement outwardly to the said arms, and means for applying yielding pressure to both the upper and lower portions of the belt.

4. In a device of the class described, the combination of a rotatable axle, a rotatable operating shaft, a casing fixed to the axle, a series of arms radially movable in said casing, their outer ends being adapted to receive a belt, a pulley operatively connected with the operating shaft, a belt connecting said pulley with said arms, a cylindrically tapered guide block slidingly mounted on the axle within the casing, and means for sliding said block to give a radial movement outwardly to the said arms, and means for applying yielding pressure to both the upper and lower portions of the belt, said means comprising a support, an arm pivoted to the support, a pulley on the arm to engage the top of the belt, a lever fulcrumed to the bottom of the support, a pulley on one end thereof to engage the lower portion of the belt, an adjustable weight on the other end of the lever, and a link connecting the weighted end of the lever with the free end of the first mentioned arm.

5. In a device of the class described, the combination of an axle, an operating shaft, a casing fixed to the axle, a series of arms extended radially through said casing, and slidingly mounted, and having forked outer ends and rounded inner ends, a guide block slidingly mounted on the axle within the casing, and having a tapered outer end portion to engage the rounded inner ends of said arms, a bell crank lever operatively connected with said sliding block, a shaft supported in front of the axle, a sleeve thereon, a foot treadle and a hand lever fixed to said sleeve, a link connecting the hand lever with the bell crank lever, a sector supported adjacent to the hand lever, a spring actuated pawl carried by the lever, and normally in engagement with the sector, a pulley operatively connected with the operating shaft, a belt connecting said pulley with the arms in the casing, and means for applying adjustably yielding pressure to the upper and lower portions of the belt.

6. In a device of the class described, the combination of a rotatable axle, a casing on the axle, a series of arms radially movable in the casing, their outer ends being forked to receive a belt, an operating shaft, a rotatable marker arm shaft operatively connected with the operating shaft, a pulley on the marker arm shaft, a belt passed over said pulley and over said arms, a cylindrically tapered guide block slidingly mounted on the axle within the casing, and means for sliding said block to give a radial movement to the said arms.

Des Moines, Iowa, April 17, 1907.

GAILLARD F. SEEMS.
GEORGE B. COPLY.

Witnesses:
JACOB F. BOWMAN,
FRED R. BROWN.